United States Patent

Aziz et al.

[19]

[11] Patent Number: 6,119,234
[45] Date of Patent: Sep. 12, 2000

[54] METHOD AND APPARATUS FOR CLIENT-HOST COMMUNICATION OVER A COMPUTER NETWORK

[75] Inventors: Ashar Aziz, Islamabad, Pakistan; Thomas Markson, San Mateo, Calif.

[73] Assignee: Sun Microsystems, Inc., Mountain View, Calif.

[21] Appl. No.: 08/883,676

[22] Filed: Jun. 27, 1997

[51] Int. Cl.[7] .................................................. G06F 13/00
[52] U.S. Cl. ............................................................ 713/201
[58] Field of Search ........................... 395/200.59, 186, 395/187.01, 188.01; 380/3, 4, 25, 30, 283; 713/170, 171, 200, 201, 202

[56] References Cited

U.S. PATENT DOCUMENTS

| | | | |
|---|---|---|---|
| 5,623,601 | 4/1997 | Vu ........................................ | 395/187.01 |
| 5,649,099 | 7/1997 | Theimer et al. ................... | 395/187.01 |
| 5,706,427 | 1/1998 | Tabuki ................................ | 395/187.01 |
| 5,778,174 | 7/1998 | Cain .................................... | 395/187.01 |
| 5,828,833 | 10/1998 | Belville et al. .................... | 395/187.01 |
| 5,850,446 | 12/1998 | Berger et al. .............................. | 380/24 |
| 5,892,900 | 4/1999 | Ginter et al. ............................. | 713/200 |

OTHER PUBLICATIONS

Harkins, "Re: introduction; certificates & proxy authentication," electronic mail sent over the Internet to IETF ipsec mailing list (ipsec@tis.com,anx–sec@dot.netrex.net), Apr. 18, 1997.

*Primary Examiner*—Robert W. Beausoliel, Jr.
*Assistant Examiner*—Pierre E. Elisca
*Attorney, Agent, or Firm*—Joseph Yang; Skadden, Arps

[57] ABSTRACT

A method and apparatus are provided for dynamically configuring authorized clients with the address of a protected host and the key and address of an intermediate device (e.g., encrypting firewall, encrypting router, secure gateway) which is protecting a number of hosts on a private network located topologically behind that intermediate device. The registered name server for a domain is configured to return a new resource record type, herein called an SX record, in response to requests for information needed for secure communications with protected hosts in that domain. The resolver on (or otherwise associated with) the authorized client is configured to use the data in the SX record to dynamically update the information used by the client to handle secure communications.

70 Claims, 12 Drawing Sheets

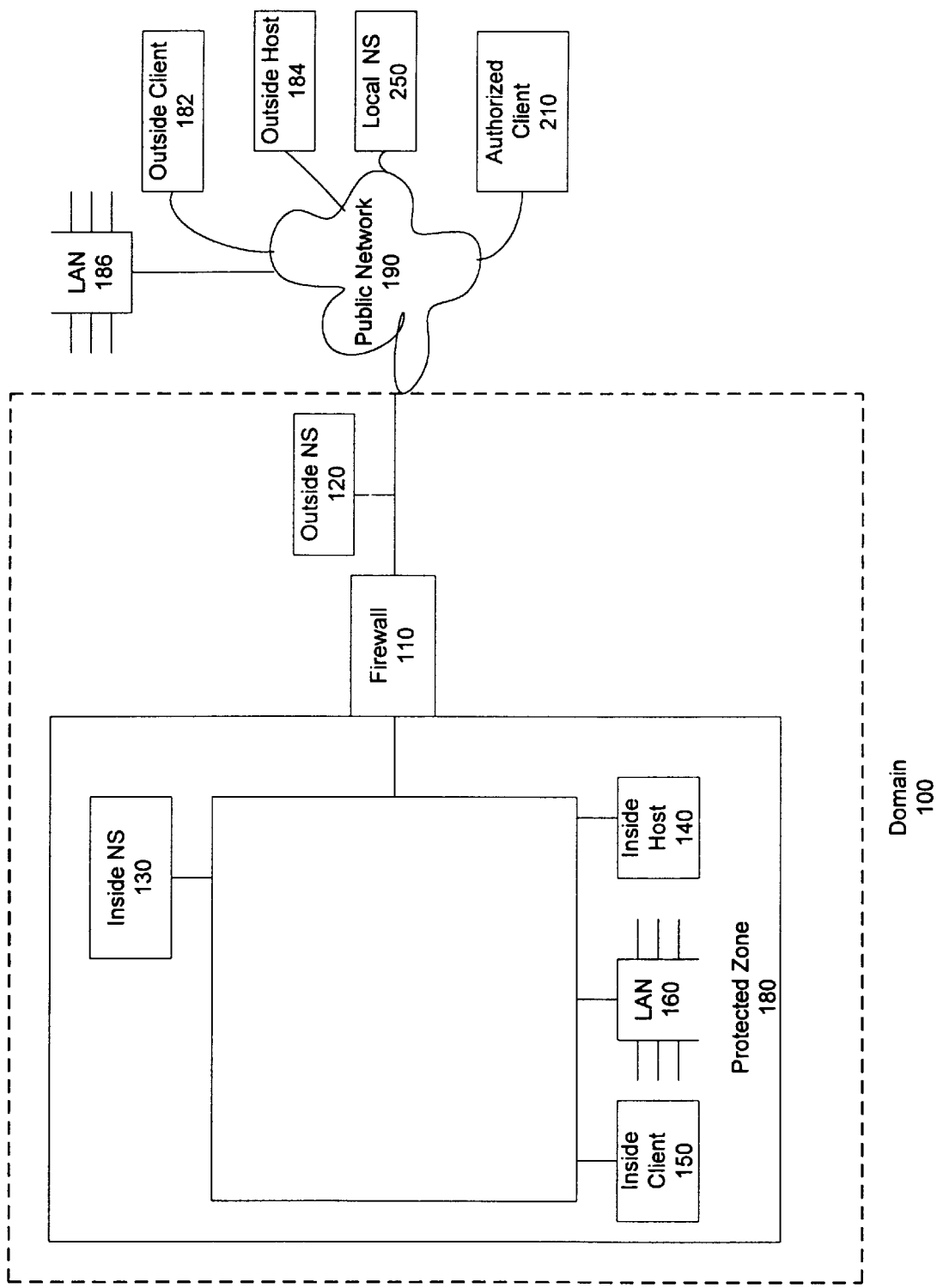

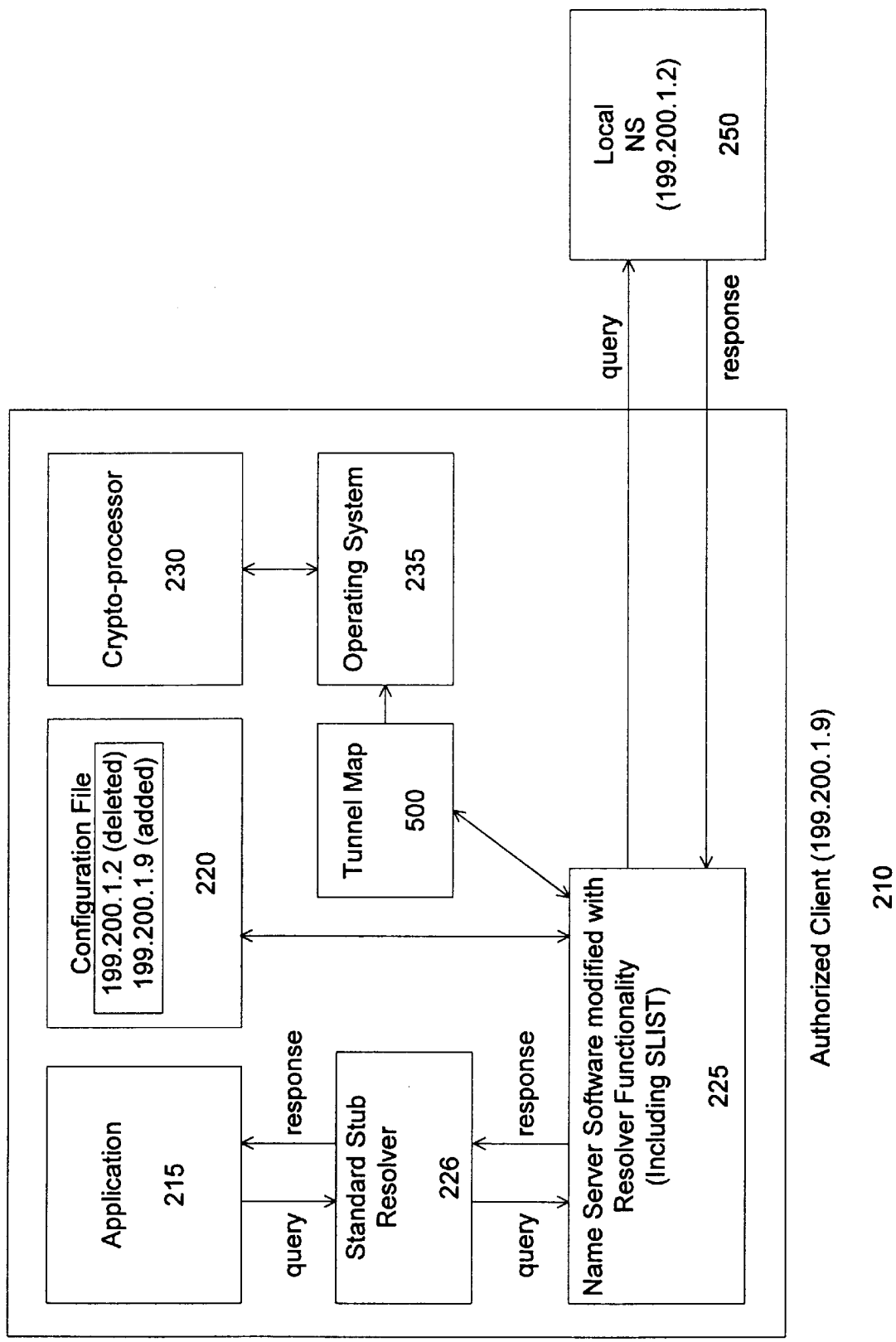

Fig. 5

| | FIELD1 510 | FIELD2 520 | FIELD3 530 | FIELD4 540 |
|---|---|---|---|---|
| Row 1 (description of contents) | destination address | address of firewall | public key or public key name | derived original database name of SX record that created this entry |
| Row 2 (1 server embodiment) | use host address in A record for requested host | use A record for firewall in SX record | use KEY record for firewall in SX record | use label count in SIG record for SX record to generate wildcard name |
| Row 3 (2 server embodiment first entry) | use name server address in A record that corresponds to name server in NS record | use A record for firewall in SX record | use KEY record for firewall in SX record | use label count in SIG record for SX record to generate wildcard name |
| Row 4 (2 server embodiment second entry) | host address in A record for requested host | use previous entry with most matching labels in field4 and copy it, point to it, etc. | use previous entry with most matching labels in field4 and copy it, point to it, etc. | use previous entry with most matching labels in field4 and copy it, point to it, etc. |

Tunnel Map Entry
500

Fig. 6A

| Section | Owner Name | Record Type | Data |
|---|---|---|---|
| Header | <header> | | |
| Query | <query> | | |
| Answer | <inside host 140><br><inside host 140> | A<br>SIG | <address of inside host 140><br><SIG data> |
| Authority | <inside host 140><br><inside host 140> | SX<br>SIG | <identifier of firewall 110><br><SIG data; label count = 2> |
| Additional | <firewall 110><br><firewall 110><br><firewall 110><br><firewall 110> | A<br>SIG<br>KEY<br>SIG | <address of firewall 110><br><SIG data><br><key data for firewall 110><br><SIG data> |

Fig. 6B

| Section | Owner Name | Record Type | Data |
|---|---|---|---|
| Header | <header> | | |
| Query | <query> | | |
| Answer | <blank> | | |
| Authority | <domain 100> | NS | <name of inside NS 130> |
| | <domain 100> | SIG | <SIG data> |
| | <inside host 140> | SX | <identifier of firewall 110> |
| | <inside host 140> | SIG | <SIG data; label count = 2> |
| Additional | <inside NS 130> | A | <address of inside NS 130> |
| | <inside NS 130> | SIG | <SIG data> |
| | <firewall 110> | A | <address of firewall 110> |
| | <firewall 110> | SIG | <SIG data> |
| | <firewall 110> | KEY | <key data for firewall 110> |
| | <firewall 110> | SIG | <SIG data> |

Fig. 6C

| Section | Owner Name | Record Type | Data |
|---|---|---|---|
| Header | <header> | | |
| Query | <query> | | |
| Answer | <inside host 140><br><inside host 140> | A<br>SIG | <address of inside host 140><br><SIG data> |
| Authority | <blank> | | |
| Additional | <blank> | | |

METHOD AND APPARATUS FOR CLIENT-HOST COMMUNICATION OVER A COMPUTER NETWORK

I. TECHNICAL FIELD OF THE INVENTION

The invention generally relates to computer networks and, in particular, to secure communications between an authorized client and a protected host over a computer network.

II. BACKGROUND OF THE INVENTION

A. Network Addresses

Computers are connected to each other to form networks that, in turn, are connected to other networks to form internets. Use of the worldwide internet know as "the Internet" has exploded as increasing numbers of people run programs on their client machines that need to communicate with host computers that are not only down the hall, but across the ocean. Each host on the Internet has a unique name, such as www.whitehouse.gov, and a corresponding network address, such as 128.102.252.1. Just as a person who sends a letter through the U.S. Postal Service needs to know the recipient's street address, a client that communicates with a host via a network needs to know the host's network address. Usually, however, the client only knows the host's name.

In the Internet world, the names and addresses of hosts are stored in databases on computers located throughout the world. A computer that has one of these databases, and responds to queries for a host's address, is known by various names, including "Domain Name Server" or simply "name server." Because so many host computers have Internet addresses, it is not practical to maintain the name and address information for all hosts in one database. Instead, such information is distributed among the Internet Domain Name Servers throughout the world.

Domain Name Servers and their associated name and address databases are just one system used to respond to address queries (also referred to as "resolving addresses"). The terms "directory service," "directory system," "DS," and others, are used to refer in general to systems that get information from an online database to respond to queries over a network. For example, distributed databases that are implemented in accordance with the X.500 directory system standard can include many types of information other than network addresses (e.g, names and addresses of people, names and locations of printers, telephone and fax numbers). Details of X.500 are well known to those skilled in the art and need not be described in detail here. See, for example, Uyless D. Black, *OSI: A Model for Computer Communications Standards*, Prentice-Hall (1991), pages 388–89.

When connecting to the Internet, an organization registers its domain name (e.g., sun.com). This is referred to as a second-level domain. The organization must designate and maintain at least two public name servers to which all address queries for the second-level domain are directed by the Internet Domain Name System. These servers will be referred to herein as the "registered" name servers for the domain. Oftentimes, an organization divides its domain into smaller segments, which are referred to as "zones" (e.g., eng.sun.com and corp.sun.com). As those skilled in the art will appreciate, the term "zone" can refer to any desired subdivision of the domain, including the full domain itself. The organization can designate name servers that are "authoritative" only for their respective zones. Each zone, then, has its own database (the "zone database") containing the names, addresses, and other information for the machines in that zone. As a matter of convenience, the term "name server" will be used herein to denote a server that responds to queries for information in the server's database (e.g., a Domain Name Server or a Directory Server) and the term "zone database" will be used to refer to that database, whether it covers a second-level domain or a smaller zone. As those skilled in the art will also appreciate, the term "database" can refer to any organized collection of information.

If the organization chooses to make the addresses of machines in a zone publicly visible, the registered name servers for the second-level domain containing the zone are configured to direct address queries for machines in the zone to the authoritative zone name servers. However, if the organization wants to hide the network topology of the zone, the registered name servers are configured without any information about the zone name servers, and only machines within the zone are configured to direct queries to the zone name servers. Such a visibility-limited zone can be referred to as a "protected zone," and the machines therein as can be referred to as "protected machines." Thus, whether or not the address of a machine is publicly visible can affect the interaction of programs running over a network.

As discussed above, when an application program running on a client needs to contact a host at another location, the application needs the host's address. In general, the application program might send a query to a "resolver" program, which also runs on the client, requesting the address. The resolver program would check a local file to identify a default name server to ask for host addresses, then pass the query on to that default name server. For convenience, this default name server will be referred to herein as the "local NS" for the client. The local NS might already have the requested address, or it might contact other name servers, as necessary, until reaching one that has the address (e.g., the registered name server for the second-level domain or the authoritative name server for the zone). If the local NS receives a response to the query, the local NS would return the response to the resolver, which would process the response and pass the address on to the client. These and other details of the Internet Domain Name System and resolvers are well known to those skilled in the art and need not be described here. See, for example, Sidnie Feit, TCP/IP, McGraw-Hill (1997), Chapter 12 for more details.

B. Authorized Clients

Current technologies do not adequately address certain aspects of communication over networks. To implement an organization's network policies, as discussed above, a network administrator may set up zones in order to hide the network topology by making the addresses of protected machines visible only to other protected machines. However, the network administrator may sometimes also want to permnit authorized clients outside the protected zone to communicate with hosts inside the protected zone. The network administrator could store the addresses of the protected hosts, with which authorized clients can communicate, in one or more static configuration files on those clients. These configuration files would then have to be updated on every authorized client every time the address of a protected host changed. The network administrator could send replacement files to every authorized client; alternatively, the network administrator could distribute the changed information to persons having access to the authorized clients for "manual" entry. Such persons could edit the configuration files directly or use a program (e.g., a command line program or graphical user interface) to enter the changed information.

With the increasing number and mobility of clients, it is burdensome, if not impossible, to keep these configuration files up-to-date. Network administrators need a way to configure authorized clients with the addresses of protected hosts that does not require human intervention to modify the configuration files on every authorized client. The solutions provided by various embodiments of the invention will enable authorized clients to dynamically update their files using information that is stored and maintained in a central location. A network administrator would then only need to update the information in an easily accessible location, rather than updating the files on every authorized client.

C. Secure Communications

Often an authorized client needs more than the address of a protected host to establish communications. This is the case when the client and host want to ensure that their communications are "secure." Secure communications encompass the issues of privacy, integrity, and authentication. Privacy means that when a client sends confidential information over a network only the intended host can read and understand it. Integrity means that no one has modified the message during transmission. Authenication means that the host is assured that the message is from the client that the message claims. Standard cryptographic methods include algorithms, such as DES and RSA, and other technologies or protocols, such as digital signatures, digital certificates, and SKIP. As needed, these cryptographic methods (or equivalent security techniques) are commonly used to ensure various aspects of privacy, integrity, and authentication.

Like supplying the addresses of protected hosts to authorized clients, secure communication is an aspect of communication over networks that the current technologies do not adequately address. In some network configurations, a firewall, which is a network security system, controls access to protected machines. To enable an authorized client to communicate securely with a protected machine, the firewall must be configured to allow communications from that client through the firewall. Further, for secure communications with a protected host, besides the host's address, an authorized client needs additional information. This additional information includes: (1) the address and key of a firewall that performs encryption for the protected host, and (2) the encryption algorithm (and other needed cryptographic methods) to be used.

Once the authorized client obtains this additional information, it is generally stored, along with the host address, in a data structure that is used by the component of the client that handles cryptographic operations (e.g., an application program, the operating system, or even a hardware crypto-processor). For example, SKIP technology stores such "outbound secure message information," in addition to inbound access information, in a client's access control list. However, those skilled in the art will understand that the outbound secure message information can be stored in any appropriate data structure.

The data structure containing the outbound secure message information has to be updated on every authorized client every time a host's address or cryptographic information changes. Once again, various embodiments of the invention will enable authorized clients to dynamically update their data structures using information that is stored and maintained in a central location. As a matter of convenience, the term "authorized client" will be used herein to refer to a client that is configured to use the invention and whose communications will be allowed through by the firewall for the protected hosts with which the authorized client communicates.

III. SUMMARY OF THE INVENTION

According to the invention, a method and apparatus are provided for dynamically configuring authorized clients with the address of a protected host and the key and address of an intermediate device (e.g., encrypting firewall, encrypting router, secure gateway) which is protecting a number of hosts on a private network located topologically behind that intermediate device. The registered name server for a domain is configured to return a new resource record type, herein called an SX record, in response to requests for information needed for secure communications with protected hosts in that domain. The resolver on (or otherwise associated with) the authorized client is configured to use the data in the SX record to dynamically update the information used by the client to handle secure communications.

Certain embodiments of the invention offer many advantages including, without limitation, the following: a system for dynamically configuring clients with the addresses of protected hosts; a system for dynamically configuring clients for secure communication with protected hosts; and, enabling network administrators to centrally administer address and encryption information needed for secure communications. These and many other advantages of certain embodiments of the invention will become apparent to those skilled in the art from the detailed description below.

IV. BRIEF DESCRIPTION OF THE DRAWINGS

An understanding of one or more embodiments of the invention may be gained by considering the following detailed description in conjunction with the accompanying drawings, in which:

FIG. 1 illustrates a typical internet configuration in which an embodiment of the invention might operate.

FIGS. 2A, 2B & 2C show exemplary configurations of a client implementing the invention.

FIG. 5 illustrates an exemplary tunnel map used by one embodiment of the invention.

FIGS. 6A, 6B & 6C illustrate exemplary responses to address queries from a client.

V. DETAILED DESCRIPTION

Figure 2A:
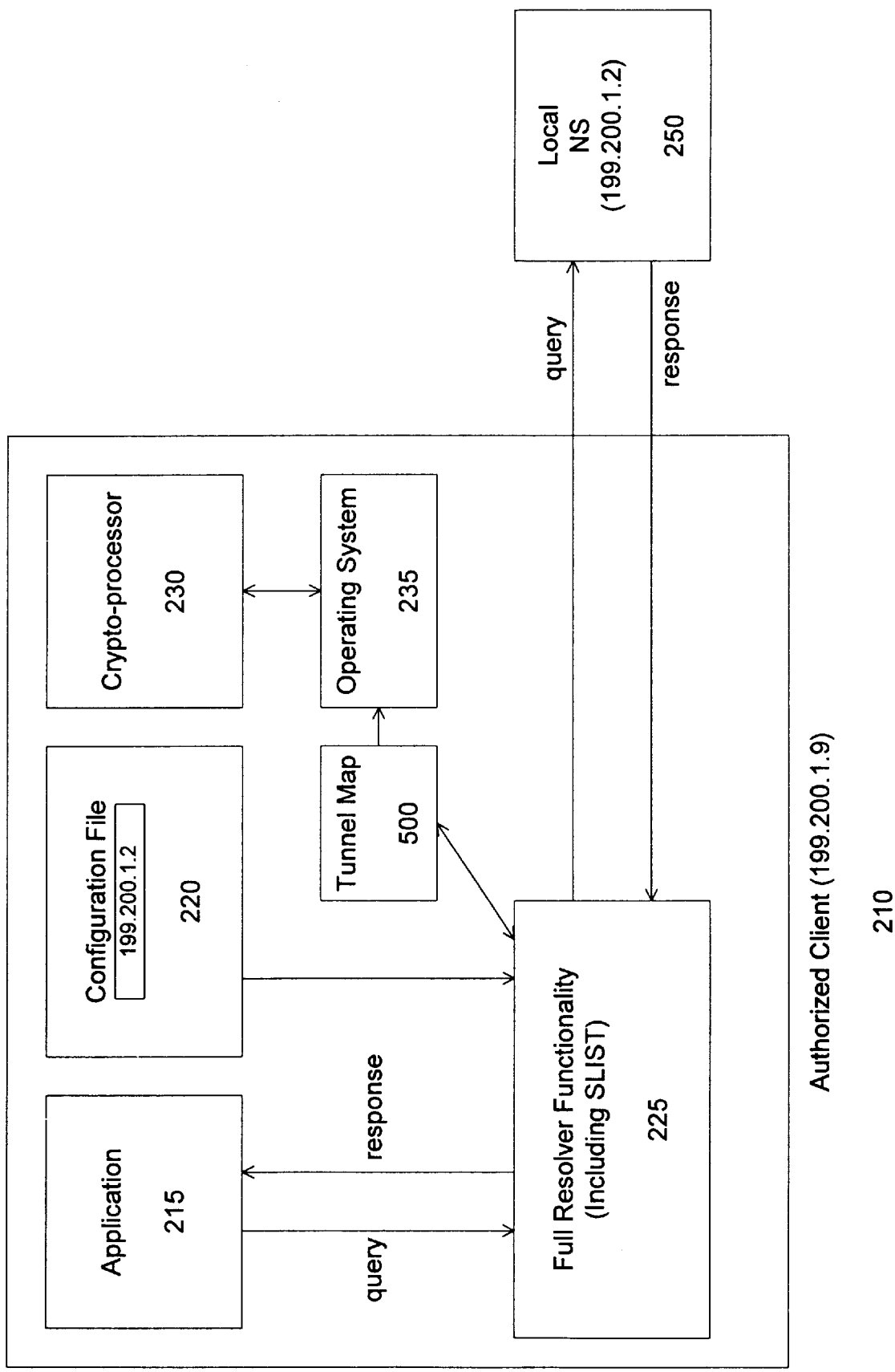

Various configurations of networks are possible, and they are referred to by assorted names, such as local area network (LAN), wide area network (WAN), intranet, internet, and the Internet. A typical internet configuration might be made up of any number of networks, including private LANs and some portion of the public Internet. Any number of computers can be attached to these networks. These computers can serve a variety of functions, and often are referred to by terms that reflect their particular function. In one example, a person runs a program on a personal computer (PC) that needs to communicate with another computer. The PC in this case might be called a client and the other computer might be called a server or a host. In another example, a computer that connects two networks might be referred to as a gateway. Alternatively, any of the computers in these examples could be referred to simply as machines. Those skilled in the art will recognize that the invention does not require any particular configuration of either the network or the computers connected thereto. Therefore, although the invention will be described with respect to one particular configuration (a client and host communicating over an internet), it should be understood that the same description would also apply to any computers operating over any network type.

A. Environment in Which the Invention Operates

FIG. 1 illustrates a typical internet configuration in which an embodiment of the invention might operate. The configuration includes a domain 100 (e.g., sun.com) that is connected by a firewall 110 to a public network 190. Domain 100 includes a protected zone 180 (sometimes referred to as "inside the firewall"), which can include any number of machines, in any configuration. In this example, an inside host 140, a LAN 160, an inside client 150, and an inside NS 130 are all in protected zone 180. Outside NS 120 is the registered name server for domain 100 and inside NS 130 is the authoritative name server for protected zone 180.

A virtually unlimited number of machines and networks are connected to public network 190. As shown in FIG. 1, a typical configuration might include an outside client 182, an outside host 184, a LAN 186, a local NS 250, and an authorized client 210. As will be clear below with respect to FIGS. 2A, 2B & 2C, a typical authorized client 210 might include an application 215, a configuration file 220 identifying its local NS 250, a resolver 225, a crypto-processor 230, an operating system 235, and a tunnel map 500 (to be described in detail later). Typically these components would be located on one or more computer-readable media or memory on authorized client 210.

B. The Problem

Given the system architecture just described, what happens when application 215 running on authorized client 210 wants to communicate securely with protected host 140 in protected zone 180? Before application 215 can do so, it needs outbound secure message information. This information, stored on authorized client 210, may include the address of inside host 140, the address and key of firewall 110, and the cryptographic protocols to use. With the increasing number and mobility of clients, it is burdensome or impossible to keep the outbound secure message information up-to-date by relying on human intervention. According to various embodiments of the invention, the problem is solved by enabling authorized clients to dynamically update their outbound secure message information using information that is stored and maintained in a central location. The following sections describe in detail the structure and content of the messages between clients and name servers, the resolver program that acts as an intermediary, and how the system is configured.

C. Name Server Messages and Resource Records

Name server messages include a header and four sections: (1) query, (2) answer, (3) authority, and (4) additional. The answer, authority, and additional sections carry the resource records that a name server sends in response to a query. There are many resource record types, and each includes a data field that contains data for that type of record. For example, the address for a requested host is returned in the data field of an A record, and the name of an authoritative name server is returned in the data field of an NS record.

To support the need for secure communications, a version of the Internet Domain Name System ("secure DNS") uses security extensions including KEY and SIG resource record types. The KEY resource record can be used to distribute public keys and associated information. That is to say, a KEY record could contain a key, a key name, or an algorithm. The SIG, or "signature," resource record can be used to authenticate the data in other resource records. One of the data fields in a SIG record is the "labels" field. This field is the count of how many labels are in the original SIG record owner name as it appears in the zone database (e.g., *.sun.com. has two labels because the null label (".") for root and the wildcard ("*") are not included in the count). This label count can, therefore, be used to derive the original name of a record that was retrieved as the result of wildcard substitution (to be described in detail later). The original name is needed, for example, to verify a digital signature.

One embodiment of the invention uses the KEY and SIG resource records provided by secure DNS. Details of secure DNS are well known to those skilled in the art and need not be described in detail here. See, for example, RFC 2065—"Domain Name System—Security Extensions" (1997). As those skilled in the art will understand, while one embodiment of the invention takes advantage of secure DNS features (e.g., to derive original names of records and to verify signatures), not all embodiments require such features (i.e., they could be implemented using other systems with sufficient capabilities).

D. SX Record

As shown above by the security extensions, the Internet Domain Name System is open-ended, in that users are free to create new resource record types. Various embodiments of the invention add yet another new record type, herein called an SX record. The data field of the SX record contains the identifier (e.g., name or address) of a "secure exchanger" associated with the owner of the record. A secure exchanger is a machine that handles secure communications for itself or for another machine (e.g., performs encryption or decryption). To perform this function, the secure exchanger uses cryptographic data (e.g., a key or algorithm). A secure exchanger's identifier and cryptographic data can be referred to collectively as the secure exchanger's parameters. Because a firewall frequently performs the secure exchanger function, the term "firewall 110" will be used herein to refer to a secure exchanger. Those skilled in the art will understand that any machine with the appropriate cryptographic capabilities can function as the secure exchanger.

Those skilled in the art will also understand that "SX" is an arbitrary record type identifier and that once an SX record type is defined, a client can explicitly ask a name server for a record of that type. Alternatively, a name server can be configured to return an SX record in the response that includes the answer to a query for some other record. For example, if the client queries for a host address, a name server might send a response with the host address in the answer section and the SX record in the additional section. Still other embodiments of the invention might include customizing the behavior of a name server to return an SX record in the or authority section, while leaving the answer section of the response empty. In other words, the response would contain only unrequested resource records. As the foregoing shows, those skilled in the art will understand that the invention does not depend upon the SX record being sent in any particular section of a response. The data in the SX record is used by a program called a resolver to update information used by a client for secure communications with protected hosts.

E. Resolvers Generally

A resolver is a program that acts as an intermediary between a name server and an application program running on a client. Resolvers receive queries for information from application programs, direct the queries to an appropriate name server, and then return the responses, if any, to the requesting application. The types of queries include host address for a given host name, host name for a given host address, and general lookups for information stored in the name server database. Resolvers generally perform four steps in handling queries: (1) return the answer to the query if it is available locally; otherwise, (2) find the best servers to ask for the answer; (3) send queries to the servers until one responds; and (4) process the response.

To identify the best servers to query in step (2), the resolver maintains a list of server names and zones in a structure called the SLIST. The SLIST is initialized with default servers. Each time the resolver subsequently interacts with a server it updates the SLIST with the resolver's "best guess" as to which servers have the desired information. This "best guess" is often based on how responsive each server is to queries about given machines (e.g., the response time or how often the server responded). Therefore, historical responsiveness is used to optimize the SLIST for future queries. As those skilled in the art understand, the resolver can be programmed to maintain the SLIST according to this or any other criteria.

The foregoing is one example of the fact that the functions that a resolver performs, and how this functionality is implemented, can be highly customized. These and other details of resolvers are well know to those skilled in the art and need not be described in detail here. See, for example, RFC 1034—"*Domain Names—Concepts and Facilities*" (1987) and RFC 1035—"*Domain Names—Implementation and Specification*" (1987).

F. Resolver Functionality

Various embodiments of the invention are implemented by customizing the resolver functionality to dynamically update a data structure on a client containing information used for secure communications with protected hosts (i.e., outbound secure message information). Such a data structure comprises data sets whose fields typically contain "tunnel information" (e.g., destination and secure exchanger addresses) and related cryptographic data (e.g., secure exchanger's key or algorithm). Herein, the term "tunnel map" will be used to refer to such a data structure and the term "tunnel map entry" to refer to one of the data sets.

According to one embodiment of the invention, a tunnel map entry also includes a field, which is not currently used in the art, to indicate the scope of coverage of the secure exchanger contained in the SX record from the name server message. In other words, this new field indicates to which machines the secure exchanger in the entry "tunnels" encrypted messages. As will be described in detail later, this field enables the creation of new tunnel map entries from pre-existing ones, thereby making the process of creating entries more efficient. However, not all embodiments of the invention require this field, and it can be omitted from tunnel map entries. The section entitled "Other Embodiments" includes an example of one such embodiment.

FIG. 5 schematically illustrates tunnel map entry 500, including field4 540. In FIG. 5, row 1 generally describes the contents of an entry's fields and rows 2 and 3–4 specifically describe field data for two embodiments of the invention. The detailed discussion of how a tunnel map entry 500 is created and used is deferred until the section entitled "Invention Implemented at an Authorized Client." Various embodiments of the invention use the tunnel map information in conjunction with standard tunneling protocols such as IPSEC or SKIP. As those skilled in the art will appreciate, the invention can easily accommodate any changes to the content or location of the information in a tunnel map.

Those skilled in the art know that resource records contain a time-to-live (TTL) field that indicates how long the record's information can be relied upon. The TTL field in the SX record could be used to determine the life of the tunnel map entries derived from that record. However, other methods, such as reinitializing the tunnel map whenever the machine is rebooted, can also be used to keep tunnel maps current. The invention does not require any particular method, but can accommodate these and other techniques known to those skilled in the art to maintain the accuracy of tunnel maps.

G. Resolver Location

Figure 2C:
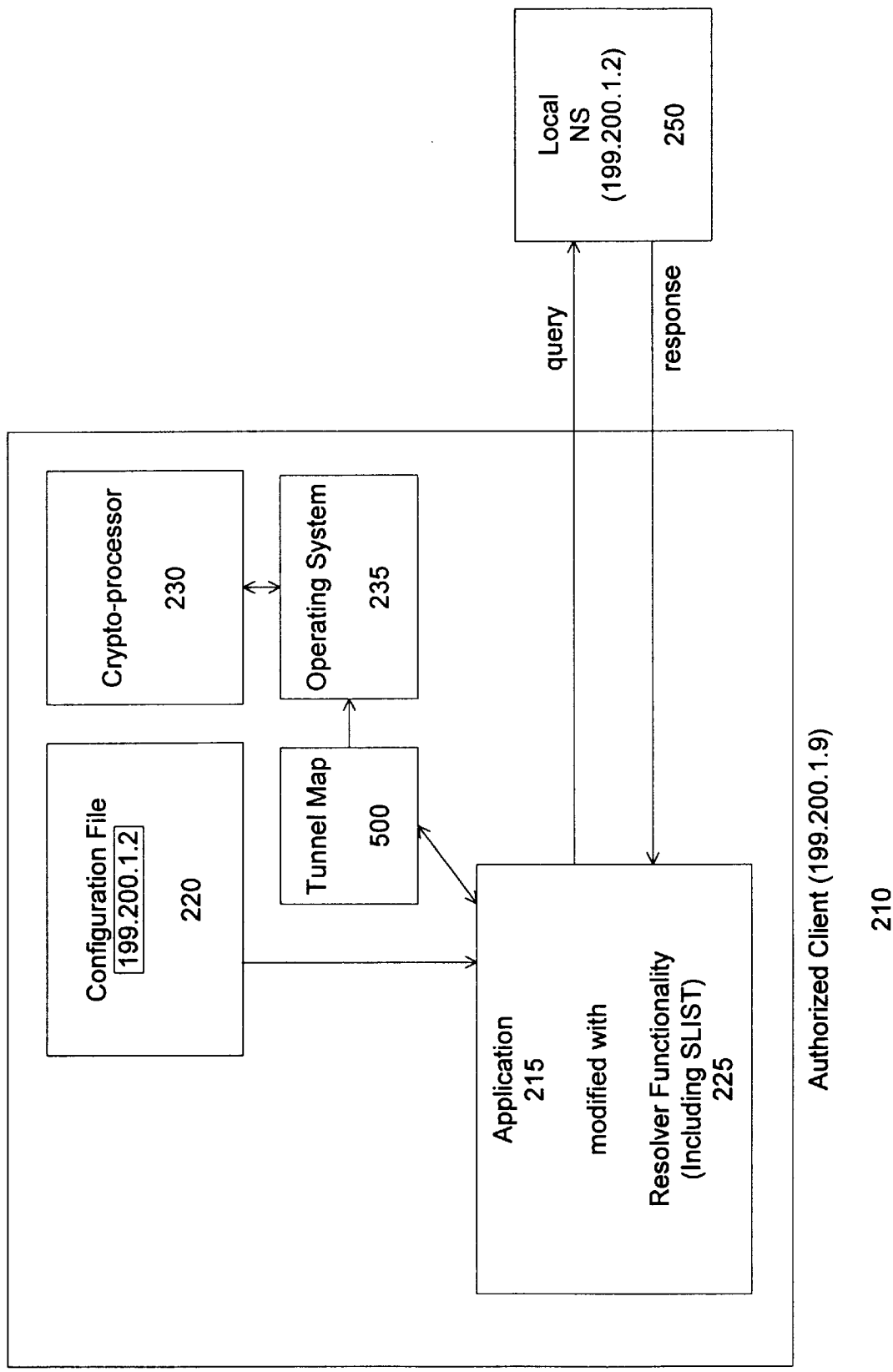

Not only can a resolver's functionality be customized, its functionality can be implemented in one or more components. The term resolver 225 will be used herein to refer to the full functionality provided by the invention, regardless of how many components are used to implement such functionality, or where those components may be located. FIGS. 2A, 2B & 2C show exemplary configurations of authorized client 210. In each configuration, the address of authorized client 210 is, e.g., 199.200.1.9 and the address of its local NS 250 is, e.g., 199.200.1.2. Accordingly, configuration file 220, used by resolver 225, contains the address of local NS 250. Application 215 is installed on authorized client 210. Any crypto-processor 230 that may be required is also installed on authorized client 210.

FIG. 2A illustrates a configuration in which the full resolver functionality is implemented in one component. In this case, application 215 sends its query to resolver 225. Resolver 225 reads the address for local NS 250 from configuration file 220 and forwards the query to local NS 250. When resolver 225 receives a response, resolver 225 processes the response as described herein.

FIG. 2B illustrates a configuration that can be implemented when it is not desirable or possible to modify a client's resolver (e.g., the client is running Microsoft Windows). In this case, a standard stub resolver 226 is used, along with a loopback to the authorized client itself. Resolver 225 is incorporated into name server software installed on authorized client 210. To implement the loopback, resolver 225 reads configuration file 220 and replaces the address of local NS 250 with the address of authorized client 210. Resolver 225 retains the address of local NS 250 for its own use. In this case, application 215 sends its query to stub resolver 226 which reads the modified configuration file 220 and directs the query to resolver 225. When resolver 225 receives the query, it forwards it to the original local NS, local NS 250, using the address that it retained from the original configuration file 220. Any response is returned to resolver 225, which processes the response as described herein.

In a third configuration, illustrated in FIG. 2C, application 215 is modified to incorporate resolver 225. Thus, to make a query, application 215 reads configuration file 220 and directs the query to local NS 250. The modified application 215 receives and processes any response. It will be appreciated by those skilled in the art that other configurations can be used without departing from the spirit and scope of the invention.

H. Overview of System Setup

Given the previous descriptions of the SX record and resolvers, this section provides an overview of how one embodiment of the system is set up. In this overview, FIG. 1 is used as a reference and the term "network administrator" is used broadly to include any individuals who perform any of the system set up tasks. These individuals might have titles other than network administrator (e.g., system administrator, LAN administrator, database administrator, or zone administrator). In fact, end users and programmers might perform some of the tasks. Further, those skilled in the art will understand that the system set up tasks are not necessarily performed by one individual. Setting up the system can be viewed as configuring three parts of the system: (1) outside NS 120, the registered name server for domain 100; (2) firewall 110; and (3) authorized client 210.

Tasks that the network administrator performs to configure outside NS 120 include defining an SX resource record type and adding appropriate records to the name server database for outside NS 120. This configuration also includes customizing outside NS 120, as described in detail in the section entitled "Invention Implemented at the Registered Name Server."

Configuring firewall 110 includes setting it up to handle encrypted communications between authorized client 210 and machines inside protected zone 180. It also includes configuring firewall 110 to recognize and allow communications from authorized client 210. Any techniques well known to those skilled in the art that can accomplish these results can be used to configure firewall 110.

Configuring authorized client 210 to operate in accordance with the invention requires components that fall into two basic categories. The first category includes the component(s) that implement resolver 225. The section entitled "Resolver Location" describes the resolver components in detail. The second category includes components (referred to collectively herein as crypto-processor 230) that perform cryptographic operations for authorized client 210. Cryptographic operations include encryption, decryption, hashing, digital certificates, digital signatures, and any others, as would be understood by one skilled in the art. Accordingly, the cryptographic components might include, but in no way would be limited to, encryption/decryption software or a PCMCIA card with cryptographic functionality.

I. Invention Implemented at the Registered Name Server

Figure 3:
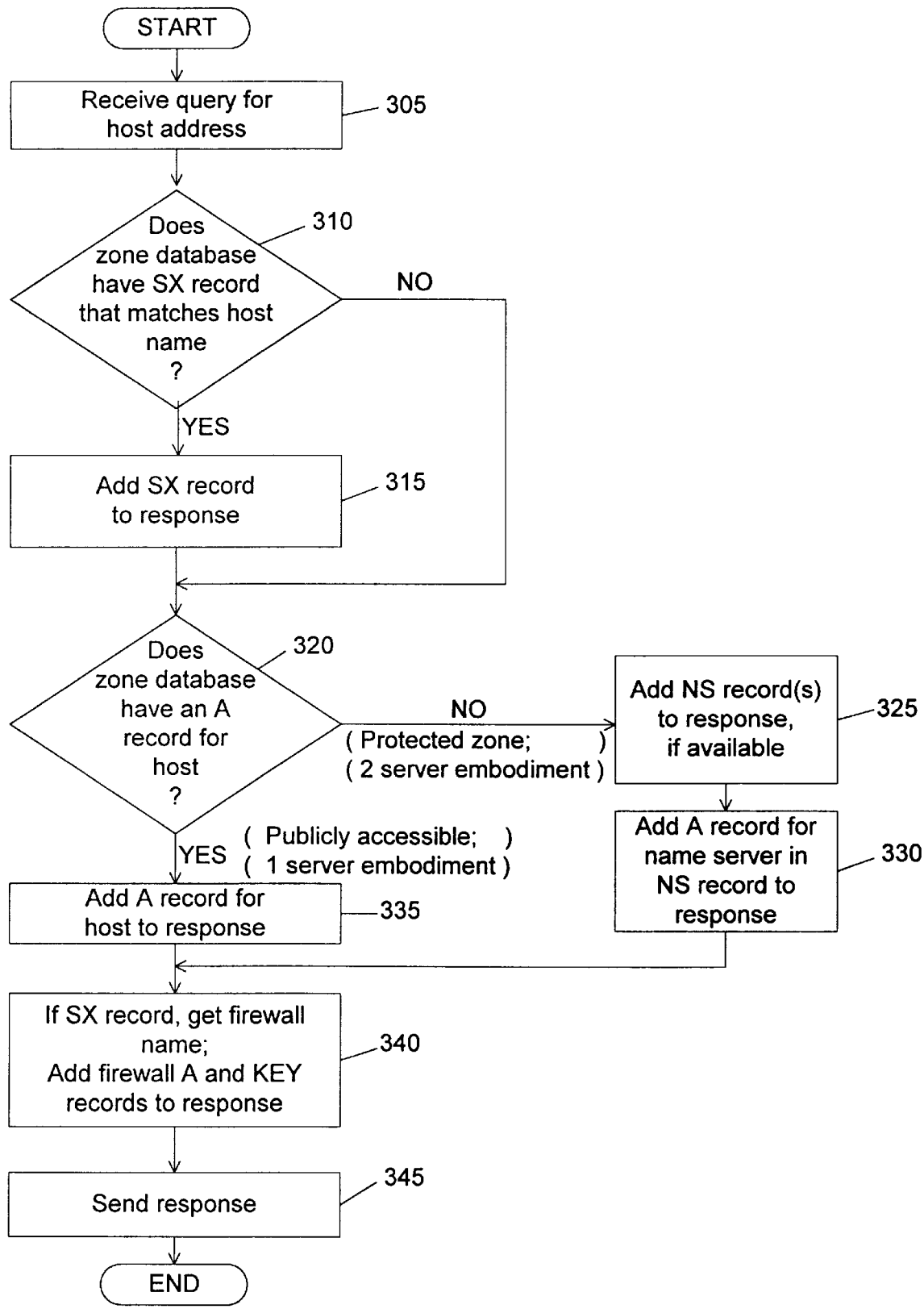
FIG. 3 shows a flow diagram of one embodiment of the invention as it operates on the registered name server for a domain.

Using the previous overview section as background, the following sections discuss the details of implementing one embodiment of the invention. In the following discussion, three points should be kept in mind. First, although name servers typically put records of a given type in certain sections of a response, the invention does not necessarily impose any such requirements. For example, although NS records typically are sent in the authority section, an implementation of the invention might use the additional section instead. Second, whenever a name server adds resource records to the response, it is implicit that the appropriate SIG and KEY records are also added (i.e., one SIG record for each record type and record owner name combination and the KEY record used to generate the SIG record). In addition, it is implicit that the SIG and KEY records are used for verifying signed records upon receipt. Third, when a step in execution that adds records to the response is described as being optional, it is understood that these records can be obtained at the client side by making additional queries. Keeping these basic points in mind, FIG. 3 shows a flow diagram of one embodiment of the invention as it operates on the registered name server for a domain. In the following discussion, outside NS 120 is the registered name server for domain 100, as shown in FIG. 1.

Execution starts at step 305 when outside NS 120 receives a query for the address of a host (the "requested host") in domain 100. At step 310, outside NS 120 checks if its zone database has an SX record with an owner name that matches the requested host name. If the database does not have such a record, execution jumps to step 320. If the database does, at step 315, outside NS 120 adds the SX record identifying the secure exchanger for the requested host to the response.

At step 320, outside NS 120 checks to see if its zone database has an A record for the requested host. If the database does include an A record for the requested host (i.e., the address of the requested host is publicly visible), outside NS 120 adds the host's A record to the response at step 335 and continues to step 340. If there is no A record in the database (i.e., the requested host is in protected zone 180), at step 325, outside NS 120 adds to the response the NS record (or records) that identify other name server(s) to query, if available. Outside NS 120 could optionally add the A record(s) for those name server(s), as shown at step 330, before continuing at step 340.

If an SX record was added to the response at step 315 then, at step 340, outside NS 120 could optionally add A and KEY records, for the secure exchanger in the data field of the SX record, to the response. Lastly, at step 345 outside NS 120 sends the response to the requester. FIG. 6A illustrates an exemplary response where the address of the requested host is publicly visible. FIG. 6B illustrates an exemplary response where the requested host is in a protected zone.

J. Invention Implemented at an Authorized Client

Figure 4A:
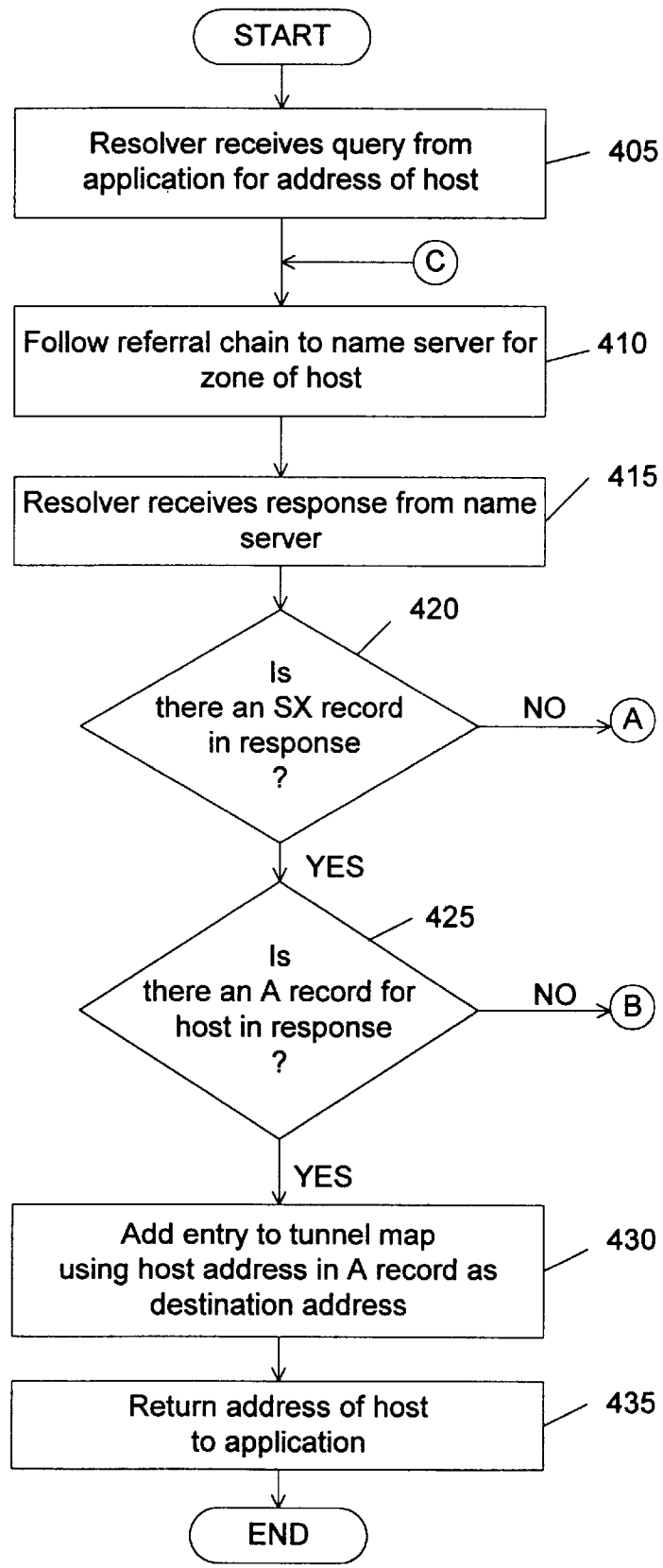
FIGS. 4A, 4B & 4C show a flow diagram of one embodiment of the invention as it operates on a client.
Figure 4B:
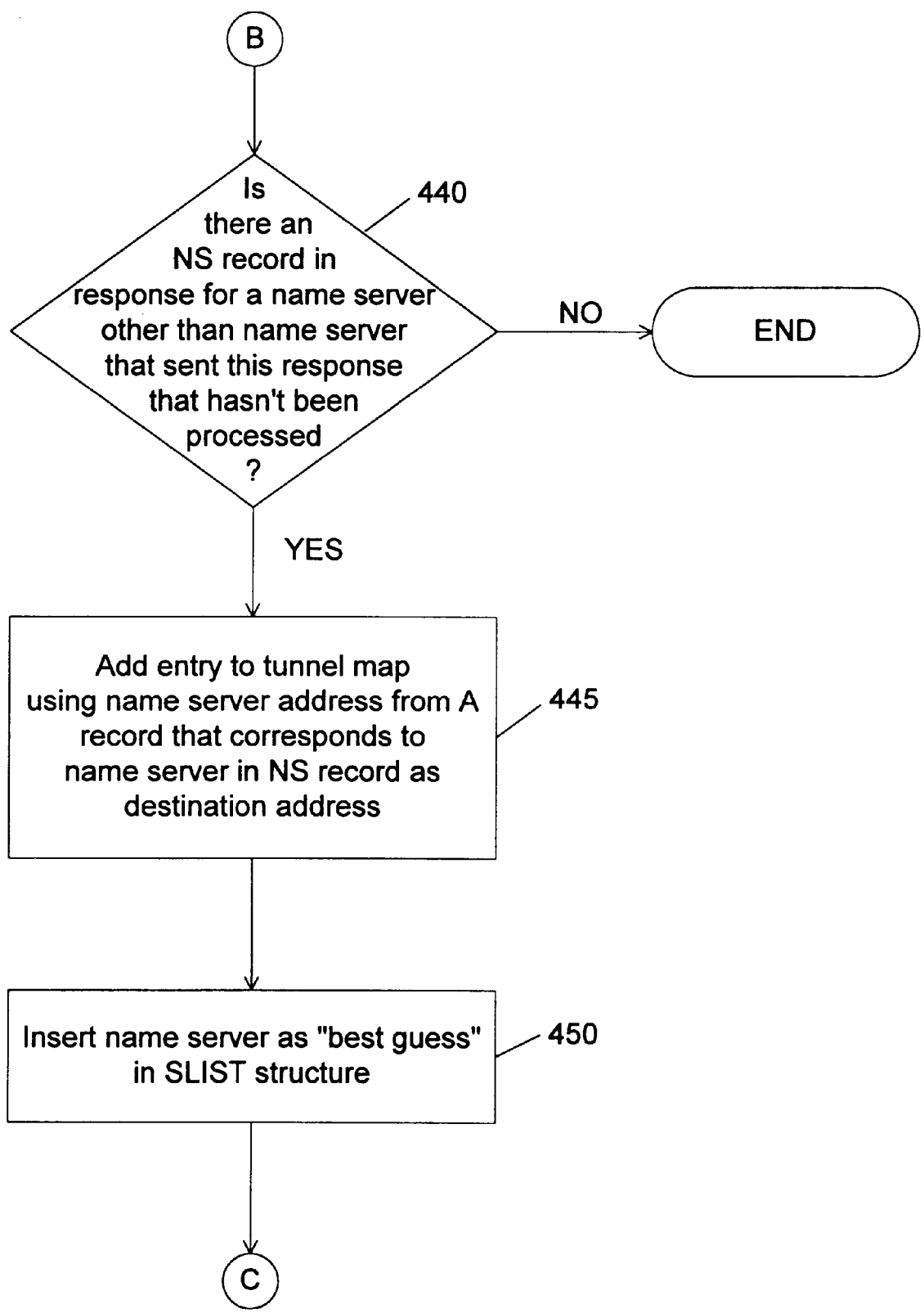
Figure 4C:
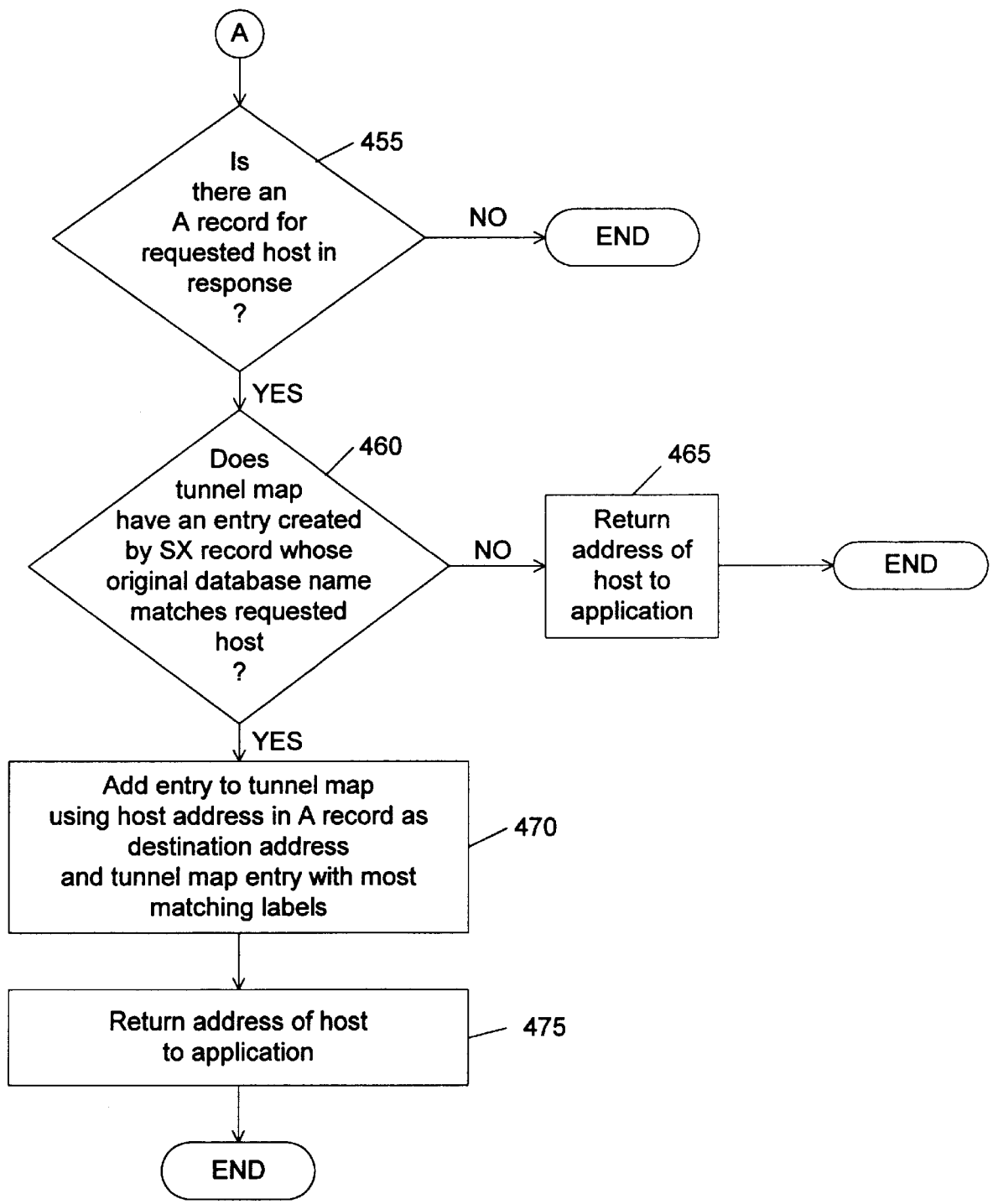

FIGS. 4A, 4B & 4C show a flow diagram of various embodiments of the invention as they operate on authorized client 210. As those skilled in the art will appreciate, the functionality described herein can be implemented either in hardware or software. In the former case, such hardware could include a general purpose processor, a microprocessor, a program logic array, an application-specific integrated circuit, and any other devices having sufficient processing capability to perform the functionality described herein. In the latter case, such software could run on any appropriate hardware platform and could be implemented using any appropriate programming language, including object oriented or procedural programming languages.

The following sections examine in detail two embodiments of the invention where application 215, running on authorized client 210, makes a query for the address of inside host 140. The first embodiment uses one name server for domain 100, and the network topology is not hidden (i.e., the address of inside host 140 is publicly visible in a one server embodiment). In other words, the registered name server's database includes an A record for inside host 140. In the second embodiment, zones are defined to hide the network topology (i.e., inside host 140 is in protected zone 180), and the database for the registered name server does not have an A record for inside host 140. Instead, this A record is maintained in the zone database used by a second server, the authoritative name server for the zone. While these embodiments follow different paths through the flow diagram, both start with steps 405–425.

At step 405, resolver 225 receives the query from application 215. At step 410, resolver 225 could follow the referral chain to the name server for the domain of inside host 140 or could pass the query on to local NS 250 if the local server supports recursive service. In any case, resolver 225 subsequently receives back a response to the query, at step 415.

At step 420, resolver 225 checks to see if there is an SX record in the response. In both of these embodiments, there will be an SX record in the first response the resolver receives (i.e., the response from the registered name server) if the registered name server's database includes an SX record with an owner name that matches the requested host name. The following discussions of these embodiments assume that such an SX record exists and is included in the response. Those skilled in the art will appreciate that, for security purposes, an SX record generally should be signed and the signature verified by the receiver upon receipt. FIG. 6A illustrates an exemplary response where the address of the requested host is publicly visible, and FIG. 6B illustrates an exemplary response where the requested host is in a protected zone.

Execution continues at step 425, where resolver 225 checks to see if there is an A record for inside host 140 in the response. It is at this step that the two embodiments follow different paths. If there is no A record in the response, execution jumps to step 440, the details of which are discussed in the section entitled "Two Server Embodiment," below. If there is an A record, execution continues at step 430, the details of which are discussed in the section entitled "One Server Embodiment," immediately following.

1. One Server Embodiment

To recap, in this embodiment, one name server is used and the network topology is not hidden. Using FIG. 1 as a reference, inside NS 130 would not be needed and the database for outside NS 120 would include records for machines in domain 100, including inside host 140. Therefore, at step 415 of FIG. 4A, the first response that resolver 225 receives to the address query from application 215 includes an A record for inside host 140 and an SX record identifying firewall 110 as the corresponding secure exchanger. FIG. 6A illustrates an example of this response.

As discussed above in the section entitled "Invention Implemented at the Registered Name Server," the response might also include the A and KEY records for firewall 110. If these additional records are not in the response, resolver 225 makes additional queries (not shown in FIG. 4A) as necessary. Also as discussed above, all appropriate SIG records are included in the response (i.e., one SIG record for each record type and record owner name combination). Once resolver 225 receives all these records, execution proceeds at step 430, where resolver 225 creates a tunnel map entry 500, such as the one illustrated in FIG. 5, which is used by crypto-processor 230 to encrypt messages to inside host 140.

Referring now to row 2 of FIG. 5, to construct tunnel map entry 500, resolver 225 uses the data in the A record for inside host 140 as the destination address in field1 510. Resolver 225 fills in field2 520 and field3 530 using the data in the A and KEY records for the secure exchanger identified in the SX record (i.e., firewall 110), respectively. As explained in the section entitled "Resolver Functionality," field4 540 is used to indicate the scope of coverage of the secure exchanger identified in the SX record. This is accomplished by deriving the original name of the SX record as it appears in the zone database and storing it in field4 540. Thus, the term "original database name" will be used herein to refer to the contents of field4 540, and the following discussion explains how resolver 225 derives this name.

Resolver 225 uses the count in the labels field of the SIG record for the SX record to determine how many labels to retain from the owner name of the record sent in the response. For example, if the owner name of the SX record (and its associated SIG record) is eng.sun.com and the labels field count is two, the original database name would be *.sun.com. If the count is three, both the original database name and the owner name of the record sent in the response would be eng.sun.com. Although wildcard names are typically used in a zone database, those skilled in the art will appreciate that wildcard names are not required. In embodiments of the invention in which the zone database does not use wildcard names, resolver 225 can alternatively derive the original database name by some other method, such as extracting the name from the SX or SIG record sent in the response. Once field4 540 is filled with the original database name, tunnel map entry 500 is complete. As explained in the section entitled "Resolver Functionality," field 540 is a new field in a data structure containing outbound secure message information that one embodiment of the invention uses to indicate the scope of coverage of the secure exchanger identified in the SX record.

Referring now to FIG. 4A, after creating tunnel map entry 500, resolver 225 returns the address of inside host 140 to application 215 at step 435. If execution ends here, application 215 can now communicate securely with inside host 140 because the tunnel map entry 500 provides all the information that crypto-processor 230 needs to encrypt messages to inside host 140. This completes the execution in an embodiment where one name server is used and the network topology is not hidden.

2. Two Server Embodiment

An embodiment where the network topology is hidden can be implemented using two name servers. Referring to FIG. 1, outside NS 120 would be the registered name server for domain 100, and the domain database would not include an A record for inside host 140. Instead, this record would be in the zone database used by inside NS 130, the authoritative name server for protected zone 180. Accordingly, in this embodiment, the first response to the query from application 215 for the address of inside host 140 is sent from outside NS 120. FIG. 6B illustrates an example of this response. Because the outside NS 120 database does not include an A record for inside host 140, there is no A record in the first response resolver 225 receives at step 415. However, in this embodiment, the response has an SX record identifying firewall 110 as the secure exchanger and at least one NS record identifying inside NS 130 as the authoritative name server for the zone. Thus, when resolver 225 checks the response for an A record at step 425 it does not find one, and execution jumps to step 440.

Referring now to FIG. 4B, at step 440, resolver 225 checks the response for an NS record containing a name server that has not yet been queried, i.e., one other than outside NS 120. Thus, in this embodiment, the first time execution reaches step 440, resolver 225 finds an NS record identifying inside NS 130 and an SX record identifying firewall 110 in the response. Note that if there is no NS record at this point, an error has occurred and execution ends.

As discussed above in the section entitled "Invention Implemented at the Registered Name Server," the response might also include the A record for inside NS 130 as well as the A and KEY records for firewall 110. If these additional records are not in the response, resolver 225 makes additional queries (not shown in FIG. 4C) as necessary. Also as discussed above, all appropriate SIG records are included in any response (i.e., one SIG record for each record type and record owner name combination). Once resolver 225 receives all these records, execution proceeds at step 445, where resolver 225 creates a tunnel map entry 500, as shown in FIG. 5.

Referring now to row 3 of FIG. 5, to construct tunnel map entry 500, resolver 225 uses the data in the A record for inside NS 130 as the destination address in field1 510. Resolver 225 fills in field2 520 and field3 530 using the data in the A and KEY records for the secure exchanger identified in the SX record (i.e., firewall 110), respectively. To fill in field4 540, resolver 225 derives the original name of the SX record as it appears in the zone database. The section entitled "One Server Embodiment" includes a detailed explanation of how resolver 225 derives this original database name.

Referring now to FIG. 4B, after creating a tunnel map entry 500, at step 450, resolver 225 inserts the name server from the NS record just processed (i.e., inside NS 130) as the "best guess" in the SLIST structure. See the section entitled "Resolvers Generally" for additional details about the SLIST. Referring now to FIG. 4A, execution jumps to step 410, where the referral chain to the name server now leads to inside NS 130 (the name server for the zone of inside host 140). The query from application 215 for the address of inside host 140 is subsequently encrypted by crypto-processor 230 using field1 510, field2 520, and field3 530 of the last tunnel map entry 500. When the query reaches inside NS 130, the server sends a standard response (e.g., an A record and the corresponding SIG record) to the requester. FIG. 6C illustrates an example of this response.

At step 415, resolver 225 receives the response, and at step 420, resolver 225 checks for an SX record. Because there is no SX record, execution jumps to step 455 (see FIG. 4C), where resolver 225 check for an A record for inside host 140. If there is no such A record, execution ends. Otherwise, at step 460, resolver 225 checks if the tunnel map has an entry created by an SX record whose original database name matches the name of inside host 140. If there is no such entry, at step 465, resolver 225 returns the address of the host to the application and execution ends. If there is a matching entry, at step 470, resolver 225 adds another tunnel map entry 500.

Referring now to row 4 of FIG. 5, resolver 225 uses the data in the A record for inside host 140 as the destination address in field1 510. To complete the other fields, resolver 225 uses the pre-existing tunnel map entry 500 where the original database name in field4 540 has the most labels matching the name of inside host 140. For example, if eng.sun.com is the name of inside host 140, eng.sun.com would have more matching labels than *.sun.com. Resolver 225 can use the fields from the previous entry to create the new entry in a variety of ways. For example, resolver 225 could copy the entries from the previous entry into the new entry, or resolver 225 could simply use pointers.

After creating tunnel map entry 500, resolver 225 returns the address of inside host 140 to application 215 at step 475. If execution ends here, application 215 can now communicate securely with inside host 140 because tunnel map entry 500 provides all the information that crypto-processor 230 needs to encrypt messages to inside host 140. This completes the execution in an embodiment where two name servers are used and the network topology is hidden.

K. Other Embodiments The invention is not limited to the two embodiments described above. For example, the invention could be implemented in a domain that comprises multiple zones. In such an embodiment, the registered name server could direct queries to multiple authoritative zone name servers.

In another embodiment, the invention could be implemented to ensure security within a private network. As those skilled in the art know, name server software can be installed on a stand-alone network. In such an embodiment, appropriate name servers would be configured to perform the functions of the registered and authoritative name servers described above.

In yet another embodiment, the resolver could ask for an SX record prior to asking for an A record for a host. In such an embodiment, the SX record would not be sent automatically by the registered name server.

In still another embodiment, the query from an authorized client to a protected name server could be for information other than the address of a host. In this embodiment the response from the registered name server could be used to send secure queries for information in the protected name server's zone database. In this embodiment the original database name indicating the scope of the secure exchanger's coverage would not be required because only a tunnel map entry for the name server is used.

Still other embodiments are possible when the resolver functionality is incorporated in an application. For instance, the tunnel map that the application creates might exist only while the program is executing. Alternatively, the tunnel map might persist, but only be accessible by the program (e.g., operating system 235 would not know about it).

In addition, various steps of disclosed embodiments could be combined in other combinations. One such embodiment is feasible if the response from the registered name server includes an address for the requested host and the tunnel map contains a pre-existing entry where the original database name matches the name of the requested host. In this embodiment a new tunnel map entry would be created for the requested host by using the pre-existing entry.

It will be appreciated by those skilled in the art that further embodiments of the invention may be made without departing from the spirit and scope of the invention as described herein. Such embodiments are intended to be within the scope of the appended claims.

What is claimed is:

1. A method for dynamically updating information used by a first machine for facilitating secure access by said first machine to a second machine, comprising the steps of:
   (a) receiving a query related to a domain containing said second machine;
   (b) contacting a first name server for said domain to request information necessary for responding to said query;
   (c) receiving a first response from said first name server;
   (d) extracting an identifier of a secure exchanger corresponding to said second machine from a resource record in said first response; and
   (e) using said identifier, which provides information about said secure exchanger to said first machine, updating a first data structure to be used by said first machine for facilitating secure access to said second machine.

2. The method of claim 1 performed by an application program generating said query.

3. The method of claim 1 wherein said step of updating said first data structure includes recording an address of said second machine.

4. The method of claim 1 wherein said step of updating said first data structure includes recording said identifier of said secure exchanger.

5. The method of claim 1 wherein said step of updating said first data structure includes recording a cryptographic datum of said secure exchanger.

6. The method of claim 5 wherein said cryptographic datum of said secure exchanger is a cryptographic key.

7. The method of claim 5 wherein said cryptographic datum of said secure exchanger is obtained from a secure DNS KEY resource record.

8. The method of claim 5 wherein said cryptographic datum of said secure exchanger is a cryptographic algorithm.

9. The method of claim 1 wherein said step of updating said first data structure includes recording an original database name pertaining to said secure exchanger.

10. The method of claim 9 wherein said original database name is derived using a label count from a signature resource record corresponding to said resource record in said first response.

11. The method of claim 9 wherein said original database name is an owner name from said resource record in said first response.

12. The method of claim 1 wherein said second machine is a subject of said query.

13. The method of claim 12 wherein said step of receiving said query includes receiving a request for an address of said second machine.

14. The method of claim 1 wherein said second machine is a second name server pertaining to said domain.

15. The method of claim 1 wherein said identifier of said secure exchanger is a name of said secure exchanger.

16. The method of claim 15 wherein said name of said secure exchanger is a DNS name.

17. The method of claim 1 wherein said identifier of said secure exchanger is an address of said secure exchanger.

18. The method of claim 1 wherein said secure exchanger is a firewall protecting said second machine.

19. The method of claim 1 wherein said secure exchanger is said second machine.

20. The method of claim 1 wherein said first data structure is an access control list.

21. The method of claim 1 wherein said first data structure is a tunnel map.

22. The method of claim 1 wherein said step of updating said first data structure includes creating at least one data set within said first data structure.

23. The method of claim 22 wherein:
   (a) said step of receiving said first response includes extracting, from said first response, an address of said second machine wherein said second machine is a subject of said query; and
   (b) said step of creating said data set includes:

(i) using said identifier of said secure exchanger, deriving a parameter of said secure exchanger;
(ii) deriving an original database name pertaining to said secure exchanger; and
(iii) storing as said data set: a) said address of said second machine, b) said parameter of said secure exchanger, and c) said original database name.

24. The method of claim 23 wherein said step of deriving said parameter of said secure exchanger includes extracting said parameter from said first response.

25. The method of claim 23 wherein said step of deriving said parameter of said secure exchanger includes making an additional query for said parameter.

26. The method of claim 23 wherein said step of deriving said parameter includes equating said parameter to said identifier.

27. The method of claim 23 wherein said parameter is a cryptographic datum of said secure exchanger.

28. The method of claim 22 wherein:
   (a) said step of receiving said first response includes deriving an address of a second name server pertaining to said domain, said second name server being specified in said first response; and
   (b) said step of creating said data set includes:
      (i) using said identifier of said secure exchanger, deriving a parameter of said secure exchanger;
      (ii) deriving an original database name pertaining to said secure exchanger; and
      (iii) storing as a first data set: a) said address of said second name server, b) said parameter of said secure exchanger, and c) said original database name.

29. The method of claim 28 wherein said step of deriving said address of said second name server includes extracting said address from said first response.

30. The method of claim 28 wherein said step of deriving said address of said second name server includes making an additional query for said address.

31. The method of claim 28 wherein said step of deriving said parameter of said secure exchanger includes extracting said parameter from said first response.

32. The method of claim 28 wherein said step of deriving said parameter of said secure exchanger includes making an additional query for said parameter.

33. The method of claim 28 wherein said second machine is said second name server pertaining to said domain.

34. The method of claim 28 further comprising the steps of:
   (a) using said first data set, obtaining a second response to said query;
   (b) extracting from said second response an address of said second machine;
   (c) determining, from said first data structure, a pre-existing data set containing a pre-existing original database name best matching a name of said second machine; and
   (d) using said pre-existing data set, storing in a second data set: (i) said address of said second machine, (ii) a pre-existing parameter of said secure exchanger, and (iii) said pre-existing original database name.

35. The method of claim 34 wherein said step of obtaining said second response to said query includes the steps of:
   (a) updating a second data structure, containing information related to responsiveness of name servers, to include said second name server as a next name server to query;
   (b) using said second data structure, redirecting said query; and
   (c) receiving a second response to said query.

36. The method of claim 35 wherein said second data structure is an SLIST.

37. The method of claim 34 wherein said step of using said pre-existing data set includes pointing to a datum from said pre-existing data set.

38. The method of claim 34 wherein said step of using said pre-existing data set includes copying a datum from said pre-existing data set.

39. The method of claim 22 wherein said data set includes a) an address of said second machine and b) a parameter of said secure exchanger.

40. The method of claim 1 wherein said step of contacting said first name server for said domain includes forwarding said query to said first name server.

41. The method of claim 1 wherein said step of contacting said first name server for said domain includes requesting said identifier of said secure exchanger.

42. A method for dynamically updating information used by a first machine for facilitating secure access by said first machine to a second machine, comprising the steps of: steps of:
   (a) obtaining an address of said second machine;
   (b) using a data structure to be used by said first machine for facilitating secure access to said second machine, determining from said data structure a pre-existing original database name best matching a name of said second machine;
   (c) using said pre-existing data set, storing in a second data set:
      (i) said address of said second machine,
      (ii) a pre-existing parameter of a secure exchanger, which provides information about said secure exchanger to said first machine, and
      (iii) said pre-existing original database name.

43. The method of claim 42 wherein said step of using said pre-existing data set includes pointing to a datum from said pre-existing data set.

44. The method of claim 42 wherein said step of using said pre-existing data set includes copying a datum from said pre-existing data set.

45. The method of claim 42 wherein said step of obtaining said address of said second machine includes:
   (a) receiving a query for said address;
   (b) forwarding said query to a name server for a domain of said second machine;
   (c) receiving a response from said name server; and
   (d) extracting said address from said response.

46. A method for facilitating secure access by a first machine to a second machine, comprising the steps of:
   (a) receiving, at a first name server, a query from said first machine related to a domain containing said second machine;
   (b) obtaining an identifier of a secure exchanger corresponding to said second machine;
   (c) generating a response including said identifier; and
   (d) transmitting said response for said first machine, said response, which provides information about said secure exchanger to said first machine, being usable by said first machine to facilitate secure access to said second machine.

47. The method of claim 46 wherein said query includes a request for an address of said second machine.

48. The method of claim 46 wherein said response enables said first machine to dynamically update information used for secure access to said second machine.

49. The method of claim 48 wherein said step of obtaining said identifier includes obtaining said identifier from a database appropriate to said second machine.

50. The method of claim 49 wherein said step of generating said response includes:
(a) obtaining a parameter of said secure exchanger; and
(b) including said parameter in said response.

51. The method of claim 50 wherein said parameter of said secure exchanger includes an address of said secure exchanger.

52. The method of claim 50 wherein said parameter of said secure exchanger includes a cryptographic datum of said secure exchanger.

53. The method of claim 52 wherein said cryptographic datum of said secure exchanger is a cryptographic key.

54. The method of claim 52 wherein said cryptographic datum of said secure exchanger is a cryptographic algorithm.

55. The method of claim 49 wherein said secure exchanger is a third machine.

56. The method of claim 55 wherein said third machine is a firewall protecting said second machine.

57. The method of claim 49 wherein said secure exchanger is said second machine.

58. The method of claim 49 wherein said identifier of said secure exchanger is a name of said secure exchanger.

59. The method of claim 49 wherein said identifier of said secure exchanger is an address of said secure exchanger.

60. The method of claim 49 wherein an answer to said query is absent from said database, and wherein said step of generating said response includes:
(a) obtaining an identifier of a second name server pertaining to said domain corresponding to said second machine; and
(b) including said identifier of said second name server in said response.

61. The method of claim 60 wherein said step of generating said response further includes providing an address of said second name server in said response.

62. The method of claim 49 wherein an answer to said query is present in said database, and wherein said step of generating said response includes the steps, of:
(a) obtaining said answer to said query; and
(b) including said answer to said query in said response.

63. A system for facilitating secure access by a first machine to a second machine, comprising:
(a) control logic configured to receive a query related to a domain containing said second machine;
(b) control logic configured to contact a first name server for said domain to request information necessary for responding to said query;
(c) control logic configured to receive a first response from said first name server;
(d) control logic configured to extract an identifier of a secure exchanger corresponding to said second machine from a resource record in said first response; and
(e) control logic configured to use said identifier, which provides information about said secure exchanger to said first machine, to update a first data structure to be used by said first machine for facilitating secure access to said second machine, said first data structure to include a data set corresponding to said second machine.

64. The system of claim 63 embodied within a software application program configured to generate said query, and to provide said generated query to said logic for receiving said query.

65. A computer-readable medium comprising a data structure for facilitating secure access by a first machine to a second machine, said data structure including a tunnel map having:
(a) an address of said second machine;
(b) a parameter of a secure exchanger corresponding to said second machine, said parameter for providing information about a secure exchanger to said second machine for the benefit of said first machine; and
(c) an original database name pertaining to said secure exchanger.

66. The computer-readable data structure of claim 65 wherein said original database name is derived using a label count from a signature resource record corresponding to a resource record identifying said secure exchanger.

67. The computer-readable data structure of claim 65 wherein said original database name is an owner name from a resource record identifying said secure exchanger.

68. The computer-readable data structure of claim 65 generated by a resolver program associated with said first machine.

69. A computer-readable medium embodying a software program for facilitating secure access by a first machine to a second machine, said software program comprising:
(a) program code configured to receive a query related to a domain containing said second machine;
(b) program code configured to contact a first name server for said domain to request information necessary for responding to said query;
(c) program code configured to receive a first response from said first name server;
(d) program code configured to extract an identifier of a secure exchanger corresponding said second machine from a resource record in said first response; and
(e) program code configured to use said identifier, which provides information about said secure exchanger to said first machine, to update a first data structure to be used by said first machine for facilitating secure access to said second machine, said first data structure to include a data set corresponding to said second machine.

70. A computer data signal, embodied in a carrier wave, for facilitating secure access by a first machine to a second machine, said data signal comprising:
(a) a code segment configured to receive a query related to a domain containing said second machine;
(b) a code segment configured to contact a first name server for said domain request information necessary for responding to said query;
(c) a code segment configured to receive a first response from said first name server;
(d) a code segment configured to extract an identifier of a secure exchanger corresponding to said second machine from a resource record in said first response; and
(e) a code segment configured to use said identifier, which provides information about said secure exchanger to said first machine, to update a first data structure to be used by said first machine for facilitating secure access to said second machine, said first data structure to include a data set corresponding to said second machine.

* * * * *